(12) United States Patent
Sasaki

(10) Patent No.: US 6,641,729 B1
(45) Date of Patent: Nov. 4, 2003

(54) MOBILE WATER PURIFYING DEVICE

(75) Inventor: Satoshi Sasaki, Kyoto (JP)

(73) Assignee: Basic Co., Ltd., Kyoto (JP)

( * ) Notice: Subject to any disclaimer, the term of this patent is extended or adjusted under 35 U.S.C. 154(b) by 0 days.

(21) Appl. No.: 09/937,745

(22) PCT Filed: Mar. 29, 2000

(86) PCT No.: PCT/JP00/01979
§ 371 (c)(1),
(2), (4) Date: Jan. 4, 2002

(87) PCT Pub. No.: WO00/59832
PCT Pub. Date: Oct. 12, 2000

(30) Foreign Application Priority Data

Apr. 2, 1999 (JP) .............................. 11/96676

(51) Int. Cl.[7] .............................................. B01D 35/02
(52) U.S. Cl. ................. 210/241; 210/416.1; 210/416.3; 210/420
(58) Field of Search ................. 210/241, 258, 210/335, 416.1, 416.3, 433.1, 420

(56) References Cited

U.S. PATENT DOCUMENTS

| | | | | |
|---|---|---|---|---|
| 1,331,900 A | * | 2/1920 | Cartwright | 210/241 |
| 1,343,471 A | * | 6/1920 | Otterson | 210/241 |
| 1,437,007 A | * | 11/1922 | Otterson | 210/241 |
| 2,760,644 A | * | 8/1956 | Nelson | 210/416.1 |
| 3,012,676 A | * | 12/1961 | Englesberg | 210/241 |
| 4,664,798 A | * | 5/1987 | Bergh | 210/241 |
| 6,200,473 B1 | * | 3/2001 | Fahey | 210/241 |

FOREIGN PATENT DOCUMENTS

| | | |
|---|---|---|
| JP | 58-97583 | 6/1983 |
| JP | 9-285783 | 11/1997 |
| JP | 3056282 | 11/1998 |

* cited by examiner

Primary Examiner—Christopher Upton
(74) Attorney, Agent, or Firm—Kirschstein, et al.

(57) ABSTRACT

A water purifying device, wherein water purification tubes are combined with a bicycle or a motorcycle having a drive wheel assembled in a body thereof. The purification tubes are mounted on the body, a feed pump is connected to the water purification tubes and a water source is connected to the feed pump through a connector. The drive wheel is connected to the feed pump through the connector. The feed pump is driven by the drive wheel, water source water is fed to the water purification tubes, and water is purified by the water purification tubes for making drinking water.

5 Claims, 6 Drawing Sheets

MOBILE WATER PURIFYING DEVICE

TECHNICAL FIELD

The invention relates to a drinking water making apparatus for purifying water in a source of water such as a river or pond to make a drinking water, for example in a stricken district, remote place or refuge.

BACKGROUND

A shortage of drinking water may be very serious in a stricken district, remote place or refuge. In this connection, there has heretofore been known a drinking water making apparatus for purifying water in a source of water such as a river or pond to make a drinking water. However, the apparatus is problematic in the failure of motive power for transportation. It is difficult to transport the apparatus of a large size by car or truck due to the situation of traffic changing for the worse in the stricken district, remote place or refuge.

On the other hand, unlike the car or truck, a bicycle is full of motive power to be easy to reach the destination. As to the bicycle, a drinking water making apparatus has heretofore been proposed to be combined with a bicycle, as disclosed in Japanese Laid-Open Patent Publication No. 285,783 of 1997. The apparatus includes a rotary pump hydraulically connected to a water purifying barrel. A pulley is fixed on the drive shaft of the pump and pressed against the drive wheel of the bicycle. Accordingly, the pump can be driven by the pulley which is rotated by the drive wheel of the bicycle to feed water to the barrel from a source of water, the barrel purifying the water to make a drinking water.

However, in case of the apparatus, the drinking water can not be obtained merely by going by bicycle to the destination. It is additionally required to transport the apparatus in some way to the destination. In addition, the trouble is that the pump can not be driven unless the pulley is pressed against the drive wheel of the bicycle. Furthermore, the work must be done at the spot. Accordingly, the pulley can not always be pressed against the drive wheel simply and reliably at the spot. A slip may come into existence between the pulley and the drive wheel. In this case, the pump can not be driven properly.

It is therefore an object of the invention to purify water to make a drinking water without difficulty in a stricken district, remote place or refuge.

DISCLOSURE OF THE INVENTION

According to the invention, a drinking water making apparatus is combined with a bicycle or motor cycle including a body in which a drive wheel is incorporated. The apparatus comprises a water purifying barrel mounted on the body. A feed pump is mounted on the body and hydraulically connected to the barrel. The apparatus further comprises hydraulically connecting means by which a source of water is hydraulically connected to the pump. The apparatus further comprises mechanically connecting means by which the drive wheel is mechanically connected to the pump so that the pump can be driven by the drive wheel to feed water to the barrel from the source, the barrel purifying the water to make a drinking water.

In a preferred embodiment, the drive wheel has a center at which a rotating shaft is disposed, the drive wheel being rotated integrally with the rotating shaft. The pump comprises a rotary pump including a drive shaft. The rotating shaft is connected to the drive shaft by the mechanically connecting means.

The mechanically connecting means comprises a chain and gears.

The drive wheel can be disconnected from the pump by the mechanically connecting means.

A changeover cock is disposed between the pump and the barrel so that the water can be hosed without feeding it to the barrel.

THE BEST MODE TO CARRY OUT THE INVENTION

Figure 1:
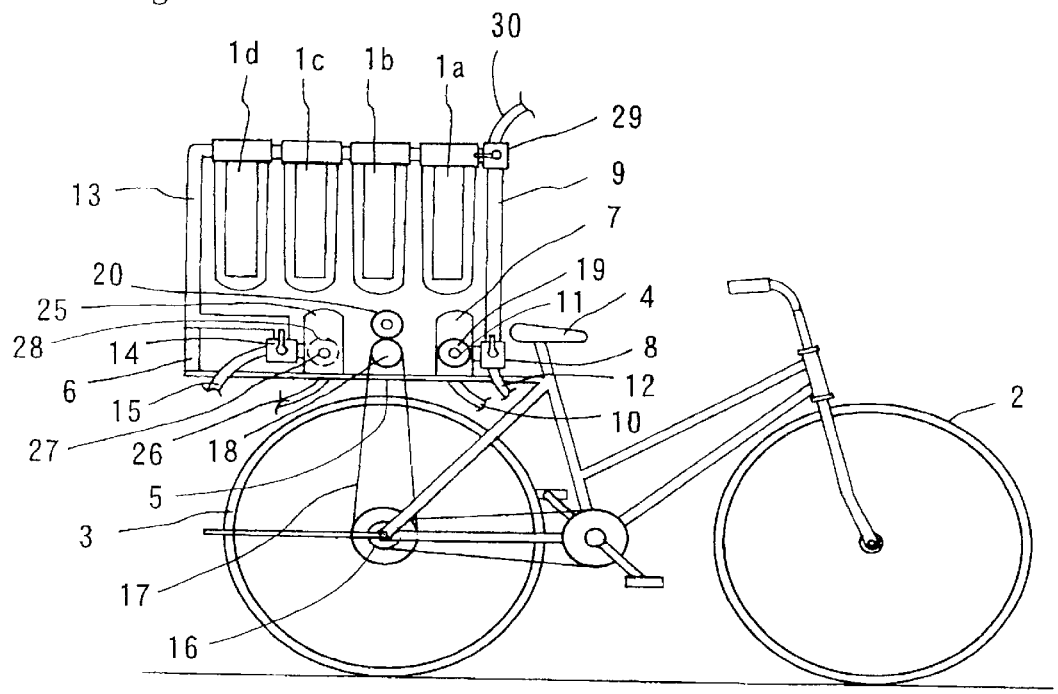
FIG. 1 is a side view of a preferred embodiment of the invention.
Figure 2:
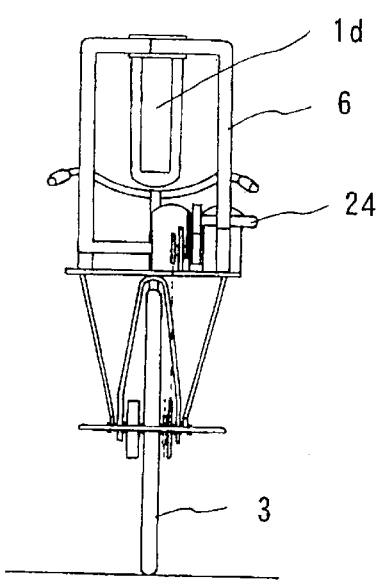
FIG. 2 is a rear view of the bicycle of FIG. 1.

Referring now to the drawings, FIG. 1 illustrates a drinking water making apparatus including four water purifying barrels 1a to 1d and combined with a bicycle, for purifying water to make a drinking water. The bicycle includes a front wheel 2, a drive wheel 3, a saddle 4 and a body 5. The front wheel 2, the drive wheel 3 and the saddle 4 are incorporated in the body 5 while the barrels 1a to 1d are mounted on the body 5. In the embodiment, the body 5 includes a frame 6 on which the barrels 1a to 1d are fixed at the rear of the saddle 4. The frame 6 is rectangular to have an upper wall from which the barrels 1a to 1d are suspended to be supported.

As to the barrels 1a to 1d, the barrel 1a is intended to preliminarily treat the water. The barrel 1b is intended to sterilize the water. For example, the barrel 1a is filled with a filter medium such as a coarse non woven fabric while the barrel 1b is filled with a germicide. The water can therefore be forced to flow through the barrel 1a for preliminary treatment with the filter medium and then flow through the barrel 1b for sterilization with the germicide. The barrel 1c is intended to absorb the chlorine. The barrel 1d is intended to finally filtrate the water. For example, the barrel 1c is filled with the activated carbon or other chemical substance while the barrel 1d is filled with a filter medium such as a hollow yarn. The water flows through the barrel 1c to absorb the chlorine into the activated carbon or other chemical substance, after sterilization. The water then flows through the barrel 1d for final filtration with the filter medium. This can purify the water to make a drinking water.

In addition, a feed pump 7 is mounted on the body 5 and hydraulically connected to the barrel 1a. In the embodiment, a three way changeover cock 8 is disposed between the pump 7 and the barrel 1a, the pump 7 being fixed on and supported by the frame 6 and hydraulically connected to the changeover cock 8, a pipe 9 and the barrel 1a. The apparatus further includes hydraulically connecting means comprising a hose 10 coupled to the pump 7, by which a source of water is hydraulically connected to the pump 7. The pump 7 comprises a rotary pump such as a gear pump including a drive shaft 11. Furthermore, a hose 12 is coupled to the changeover cock 8. As to the barrels 1a to 1d, the barrel 1a is hydraulically connected to the barrel 1b which is hydraulically connected to the barrel 1c. The barrel 1c is hydraulically connected to the barrel 1d which is hydraulically connected to a pipe 13, a three way changeover cock 14 and a hose 15.

Figure 3:
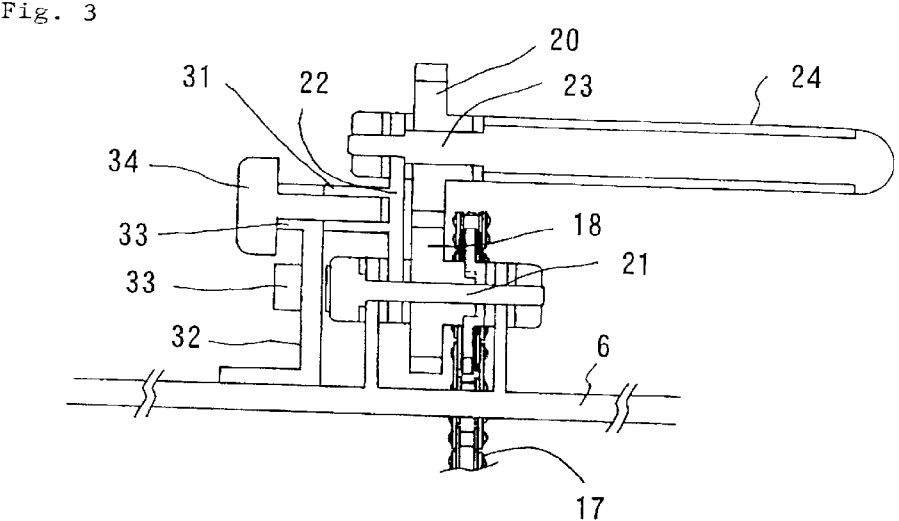
FIG. 3 is a sectional view of the mechanically connecting means of FIG. 1.
Figure 4:
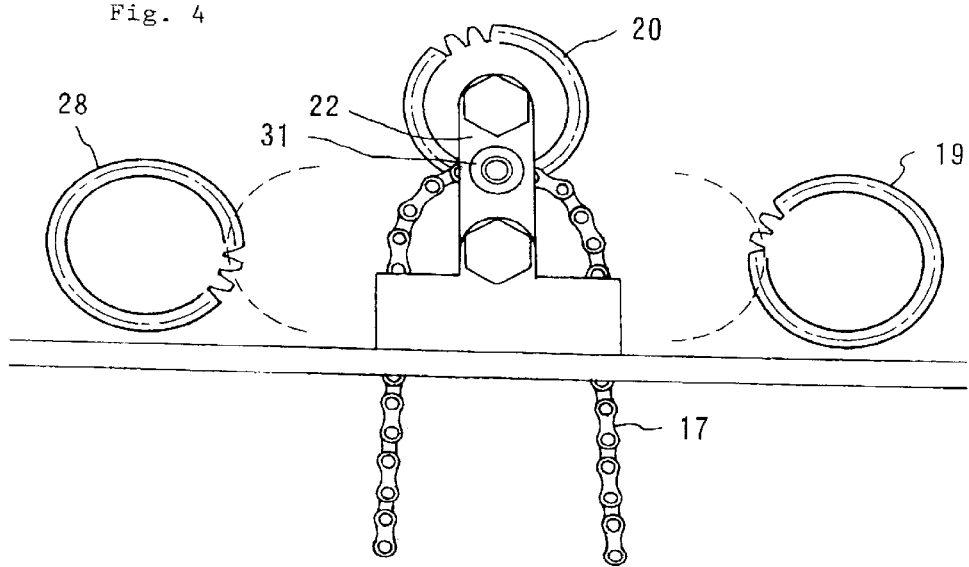
FIG. 4 is a side view of the mechanically connecting means of FIG. 3.

The apparatus further includes mechanically connecting means by which the drive wheel 3 is mechanically connected to the pump 7. The drive wheel 3 has a center at which a rotating shaft 16 is disposed. The drive wheel 3 is rotated integrally with the rotating shaft 16. The mechanically connecting means comprises a chain 17 and gears 18, 19 and 20, the rotating shaft 16 being connected to the gear 18 by the chain 17 and sprockets. The gear 18 is mounted on a spindle 21 for rotation, the spindle 21 being fixed on the frame 6, as shown in FIG. 3. The gear 19 is fixed on the drive shaft 11 of the pump 7. In addition, a lever 22 is mounted on the spindle 21 for swinging movement. The gear 20 is mounted on a spindle 23 for rotation and engaged with the gear 18, the spindle 23 being fixed on the lever 22. The spindle 23 includes a handle 24 by which the lever 22 is swingingly moved about the spindle 21 so that the gear 20 can be circularly moved about the gear 18 to be engaged with the gear 19. The rotating shaft 16 is therefore mechanically connected to the drive shaft 11 by the chain 17 and the gears 18, 19 and 20 whereby the drive wheel 3 can be mechanically connected to the pump 7.

The lever 22 may be swingingly moved about the spindle 21 to stand upwardly of the spindle 21 so that the gear 20 can be disengaged from the gear 19. The drive wheel 3 can therefore be disconnected from the pump 7 by the mechanically connecting means. In addition, an additional pump 25 is fixed on and supported by the frame 6 and hydraulically connected to the changeover cock 14, a hose 26 being coupled to the pump 25. The pump 25 comprises a rotary pump such as a gear pump including a drive shaft 27. A gear 28 is fixed on the drive shaft 27 of the pump 25, the lever 22 being swingingly moved about the spindle 21 so that the gear 20 can be circularly and reversely moved to be engaged with the gear 28. The rotating shaft 16 is therefore mechanically connected to the drive shaft 27 by the chain 17 and the gears 18, 20 and 28 whereby the drive wheel 3 can be mechanically connected to the pump 25. Furthermore, the pipe 9 includes a three way changeover cock 29 to which a hose 30 is coupled.

The apparatus further includes a boss 31 formed on the lever 22 and a bracket 32 fixed on the frame 6, a boss 33 being formed on the bracket 32. The boss 31 includes a threaded hole formed therein while the boss 33 includes a through hole formed therein. The apparatus further includes a locking bolt 34 passing through the through hole in the boss 33 and engaged with the threaded hole in the boss 31 to thereby lock the lever 22. The locking bolt 34 is then disengaged and drawn from the threaded hole in the boss 31 so that the lever 22 can be swingingly moved about the spindle 21, the gear 20 being circularly moved about the gear 18.

In the embodiment, three bosses 33 are formed on the bracket 32 to be angularly spaced from each other about the gear 18 so that the locking bolt 34 can be forced to pass through the through hole in one of the bosses 33 to lock the lever 22 at a position in which the gear 20 is engaged with the gear 19. The locking bolt 34 can be forced to pass through the through hole in another boss 33 to lock the lever 22 at a position in which the gear 20 is engaged with the gear 28. The locking bolt 34 can also be forced to pass through the through hole in the other boss 33 to lock the lever 22 at a position in which the gear 20 are disengaged from the gears 19 and 28 and the lever 22 stands upwardly of the spindle 21.

Accordingly, the apparatus can lock the lever 22 at the position in which the lever 22 stands upwardly of the spindle 21 to prevent the gear 20 from being engaged with the gear 19 and 28. The drive wheel 3 is therefore kept disconnected from the pumps 7 and 25. In this case, the gears 18 and 20 are merely idled by the chain 17 which is driven by the drive wheel 3 with little resistance. As a result, the bicycle can be ridden smoothly to go to the destination. Unlike the car or truck, the bicycle is advantageous to be full of motive power and easy to reach the destination regardless of the situation of traffic changing for the worse in the stricken district, remote place or refuge.

Figure 5:
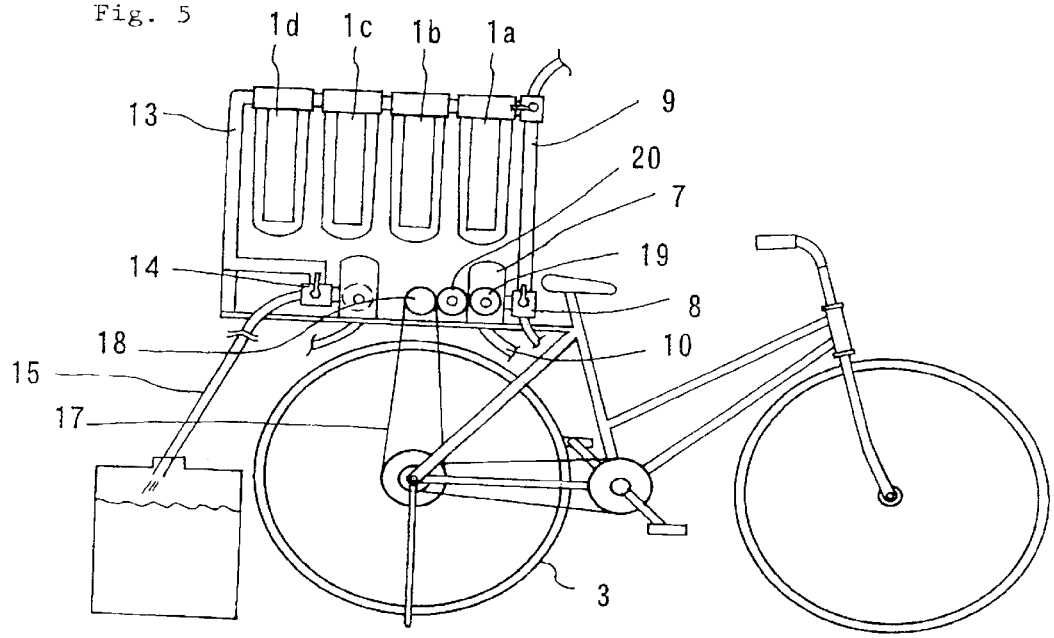
FIG. 5 is a side view illustrating a use for the bicycle of FIG. 1.

The lever 22 is swingingly moved about the spindle 21 so that the gear 20 can be engaged with the gear 19, as shown in FIG. 5, after reaching the destination in the stricken district, remote place or refuge and making the stand of the bicycle stand. The lever 22 is locked at that position. The hose 10 is then directed to a source of water such as a river or pond so that the source can be hydraulically connected to the pump 7 by the hose 10. The drive wheel 3 is then rotated by the pedals so that the pump 7 can be driven by the gears 18, 19 and 20 which are rotated by the chain 17 driven by the drive wheel 3. The drive wheel 3 functions as a flywheel so that the pump 7 can be driven smoothly. The pump 7 therefore feeds water to the barrels 1a to 1d from the source. The water flows through the hose 10, the pump 7, the changeover cock 8, the pipe 9 and the barrels 1a to 1d, the barrels 1a to 1d purifying the water to make a drinking water which flows through the pipe 13 and the changeover cock 14 to be discharged from the hose 15.

Figure 6:
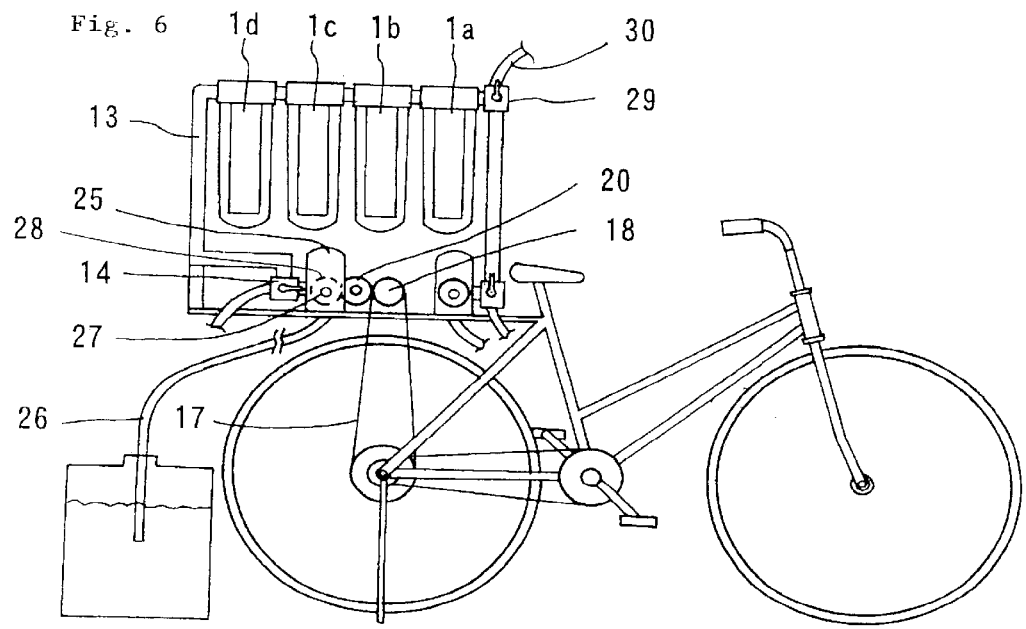
FIG. 6 is a side view illustrating other use.

The gear 20 may be engaged with the gear 28, as shown in FIG. 6. The lever 22 is locked at that position. The hose 26 is then directed into a purified water tank after changing the changeover cock 14 and 29. The drive wheel 3 is rotated by the pedals so that the pump 25 can be driven by the gears 18, 20 and 28 which are rotated by the chain 17 driven by the drive wheel 3. The pump 25 therefore feeds purified water to the barrels 1a to 1d from the tank. The purified water flows through the hose 26, the pump 25, the changeover cock 14, the pipe 13 and the barrels 1a to 1d. The purified water then flows through the changeover cock 29 to be discharged from the hose 30. The barrels 1a to 1d can therefore be backwashed by the purified water reversely flowing through the barrels 1a to 1d from the tank.

Figure 7:
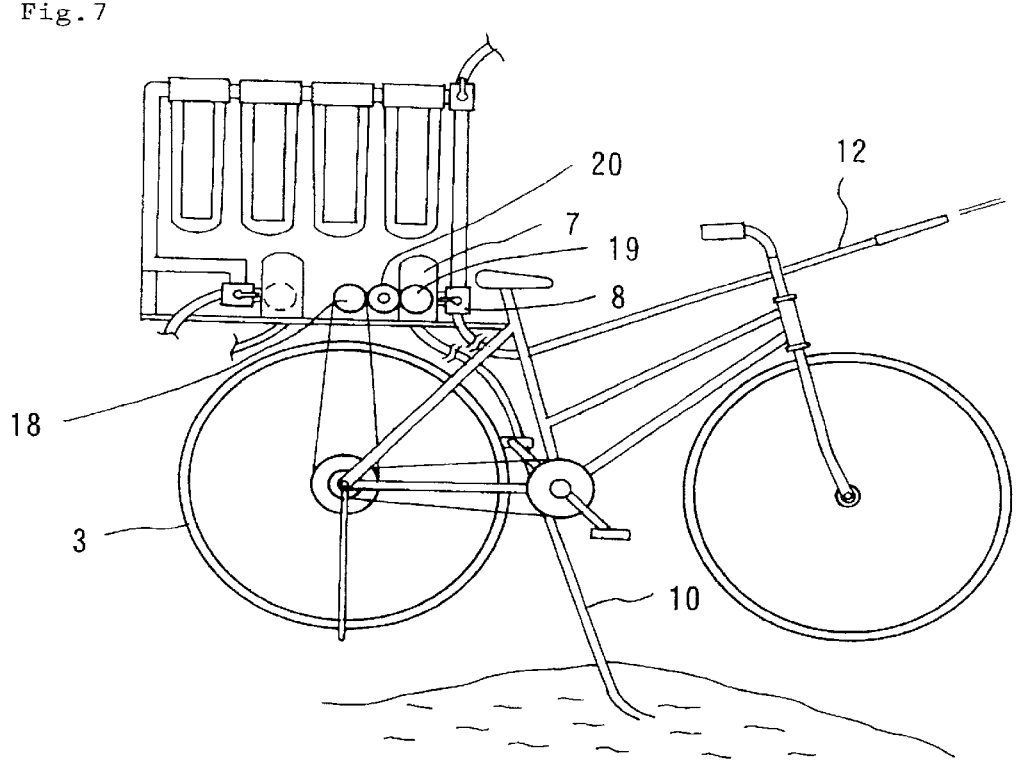
FIG. 7 is a side view illustrating other use.

The gear 20 may be engaged with the gear 19 again, as shown in FIG. 7. The lever 22 is locked at that position. The drive wheel 3 is then rotated by the pedals after changing the changeover cock 8 so that the water flows through the hose 10, the pump 7 and the changeover cock 8 to be discharged from the hose 12. The water can therefore be hosed without feeding it to the barrels 1a to 1d for extinction of a fire.

Accordingly, the apparatus can utilize the barrels 1a to 1d of the bicycle and purify water to make a drinking water merely by going by bicycle to the destination in a stricken district, remote place or refuge. Unlike the apparatus of Japanese Laid-Open Patent Publication No. 285,783 of 1997, it is not additionally required to transport a drinking water making apparatus to the destination. In addition, no pulley has to be pressed against the drive wheel of the bicycle. The drive wheel 3 can be mechanically connected to the pump 7 by the mechanically connecting means such as a chain 17 and gears 18, 19 and 20. In this case, no slip comes into existence between the drive wheel 3 and the pump 7. The pump 7 can therefore be driven properly by the drive wheel 3 which is rotated by the pedals, to be high in efficiency. Accordingly, the apparatus can purify water to make a drinking water without difficulty.

Figure 8:
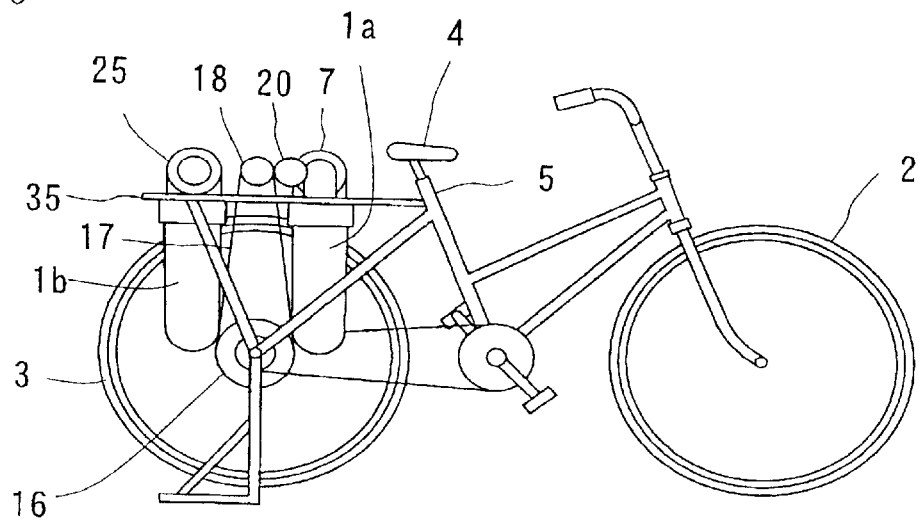
FIG. 8 is a side view of other embodiment.
Figure 10:
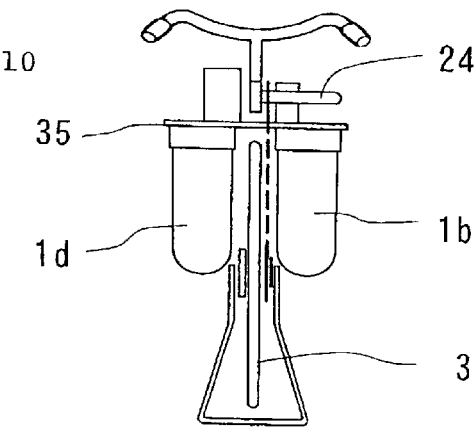
FIG. 10 is a rear view of the bicycle of FIG. 8.
Figure 9:
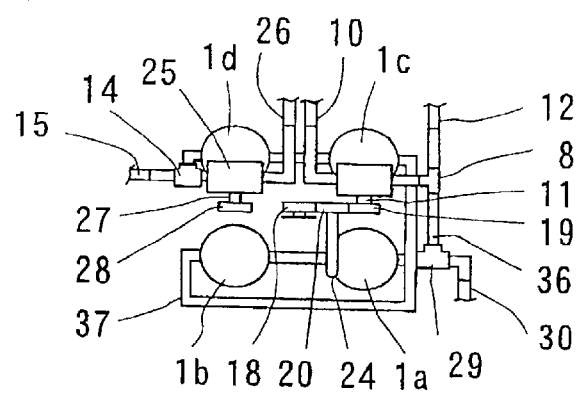
FIG. 9 is a plan view of the barrels of FIG. 8.

In other embodiment shown in FIG. 8 to FIG. 10, the body 5 includes a flat frame 35 disposed at the rear of the saddle 4. The barrels 1a to 1d are disposed on the opposite sides of the drive wheel 3 and fixed on, suspended from and supported by the frame 35. The pump 7 is fixed on and supported by the frame 35, the hose 10 being coupled to the pump 7, the pump 7 being hydraulically connected to the changeover cock 8, a pipe 36 and the barrel 1a, as in the case of the embodiment of FIG. 1. The barrel 1a is hydraulically connected to the barrel 1b which is hydraulically connected to a pipe 37 and the barrel 1c. The barrel 1c is hydraulically connected to the barrel 1d which is hydraulically connected to the changeover cock 14 and the hose 15. The pump 25 is fixed on and supported by the frame 35 and hydraulically connected to the cock 14, the hose 26 being coupled to the pump 25, as also in the case of the embodiment of FIG. 1. The pipe 36 includes the changeover cock 29 to which the hose 30 is coupled, as also in the case of the embodiment of FIG. 1.

In the embodiment, the gear 20 is circularly moved about the gear 18 to be engaged with the gear 19 so that the rotating shaft 16 can be mechanically connected to the drive shaft 11 by the chain 17 and the gears 18, 19 and 20 whereby the drive wheel 3 can be mechanically connected to the pump 3, as also in the embodiment of FIG. 1. The drive wheel 3 is then rotated by the pedals so that the pump 7 can be driven by the gears 18, 19 and 20 which are rotated by the chain 17 driven by the drive wheel 3. The pump 7 therefore feeds water to the barrels 1a to 1d from the source. The water flows through the hose 10, the pump 7, the changeover cock 8 and the barrels 1a to 1d, the barrels 1a to 1d purifying the water to make a drinking water which flows through the changeover cock 14 to be discharged from the hose 15.

The gear 20 may be engaged with the gear 28 so that the rotating shaft 16 can be mechanically connected to the drive shaft 27 by the chain 17 and the gears 18, 19 and 20 whereby the drive wheel 3 can be mechanically connected to the pump 25. The drive wheel 3 is then rotated by the pedals so that the pump 25 can be driven by the gear 18, 20 and 28 which are rotated by the chain 17 driven by the drive wheel 3. The pump 25 therefore feeds purified water to the barrels 1a to 1d from a purified water tank through the hose 26 and the changeover cock 14. The purified water is then discharged from the hose 30 through the changeover cock 29. The barrels 1a to 1d can therefore be backwashed by the purified water reversely flowing to the barrels 1a to 1d from the tank.

The gear 20 may be engaged with the gear 19 again, the drive wheel 3 being then rotated by the pedals after changing the changeover cock 8 so that the water flows through the hose 10, the pump 7 and the changeover cock 8 to be discharged from the hose 12. The water can therefore be hosed without feeding it to the barrels 1a to 1d.

The gear 20 may be disengaged from the gear 19 and 28 so that the drive wheel 3 can be disconnected from the pumps 7 and 25. Accordingly, the bicycle can be ridden smoothly to go to the destination.

Figure 11:
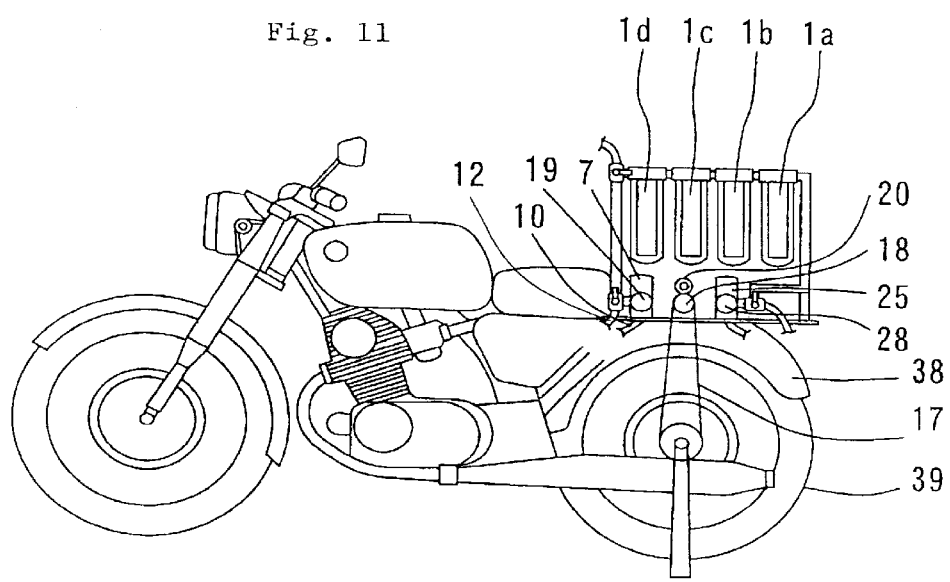
FIG. 11 is a side view of other embodiment.

In other embodiment shown in FIG. 11, the drinking water making apparatus is combined with a motor cycle including a body 38 in which a drive wheel 39 is incorporated. The barrels 1a to 1d are mounted on the body 38. The pump 7 is mounted on the body 38 and hydraulically connected to the barrels 1a to 1d. The motor cycle further includes a stand, as in the case of the bicycle of FIG. 1. Accordingly, a source of water can be hydraulically connected to the pump 7 by the hose 10 after making the stand of motor cycle stand. In addition, the drive wheel 39 can be mechanically connected to the pump 7 by the chain 17 and the gears 18, 19 and 20. The pump 7 can therefore be driven by the drive wheel 39 to feed water to the barrels 1a to 1d from the source, the barrels 1a to 1d purifying the water to make a drinking water.

The pump 25 is mounted on the body 38, as in the case of the above embodiments. The drive wheel 39 can be mechanically connected to the pump 25 by the chain 17 and the gears 18, 20 and 28. The pump 25 can therefore be driven by the drive wheel 39 so that the barrels 1a to 1d can be backwashed. The water can be discharged from the hose 12 to be hosed without feeding it to the barrels 1a to 1d. The gear 20 may be disengaged from the gears 19 and 28 so that the drive wheel 39 can be disconnected from the pumps 7 and 25.

What is claimed is:

1. A drinking water making apparatus combined with a bicycle or motor cycle including a body in which a drive wheel is incorporated, said apparatus comprising:

a water purifying barrel mounted on said body for purifying water to make a drinking water;

a feed pump mounted on said body and hydraulically connected to said purifying barrel;

hydraulically connecting means by which a source of water is hydraulically connected to said pump; and mechanically connecting means by which said drive wheel is mechanically connected to said pump so that said pump can be driven by said drive wheel to feed water to said barrel from said source.

2. The apparatus as set forth in claim 1 wherein said drive wheel has a center at which a rotating shaft is disposed, said drive wheel being rotated integrally with said rotating shaft, said pump comprising a rotary pump including a drive shaft, said rotating shaft being connected to said drive shaft by said mechanically connecting means.

3. The apparatus as set forth in claim 2 wherein said mechanically connecting means comprising a chain and gears.

4. The apparatus as set forth in claim 3 wherein said drive wheel can be disconnected from said pump by said mechanically connecting means.

5. The apparatus as set forth in claim 1 wherein a changeover cock is disposed between said pump and said barrel so that said water can be hosed without feeding it to said barrel.

* * * * *